UNITED STATES PATENT OFFICE.

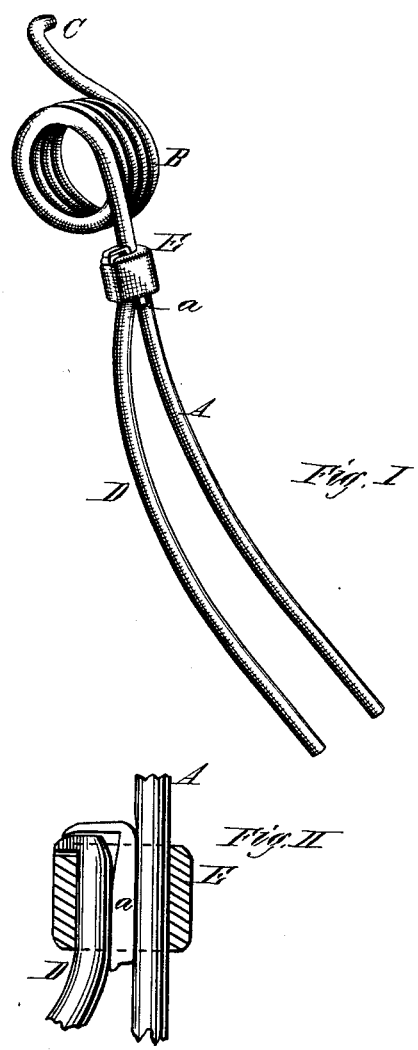

ANDREW GALE, OF CHICOPEE FALLS, MASSACHUSETTS.

IMPROVEMENT IN SPRING-TEETH FOR HORSE-RAKES AND TEDDERS.

Specification forming part of Letters Patent No. 220,917, dated October 28, 1879; application filed December 21, 1878.

*To all whom it may concern:*

Be it known that I, ANDREW GALE, of Chicopee Falls, in the State of Massachusetts, have invented a new and useful Improvement in Spring-Teeth for Horse-Rakes and Tedders; and I do hereby declare that the following is a full, clear, and exact description thereof, reference being had to the accompanying drawings, making a part of this specification, and to the letters of reference marked thereon.

The object of my invention is to increase the number of teeth upon a bar of any given length as ordinarily used without injuring their elastic quality; and to this end my invention consists of one or more auxiliary teeth secured firmly to the single tooth or wire of which the spring-coil is made by means of a clamp and key, as will be more fully hereinafter described.

Figure I is a perspective view of my invention; and Fig. II is a longitudinal section at the point where the auxiliary tooth is attached, showing the method of attachment.

In the drawings, A represents the main single tooth of a tedder, extending directly from the spring-coil B, made in the ordinary manner, with a projection, C, by which it is secured in place on the bar, or which, being extended, forms another spring-coil and tooth, making the coils and teeth double or in pairs from a single wire.

At any desired point below the coil B, I slightly flatten the wire of which the tooth A is made on its side, and slightly flatten the wire D near its end, and insert both wires into a clamp or flattened ring, E, to the point where the wires are flattened. I then drive a wedge or key, a, firmly in between the wires, turning the small end of the key outward over the end of the wire D, so that the latter cannot move upward and the key cannot move downward. As thus secured neither wire can move in the clamp, nor can the clamp move along both wires.

By making the clamp E wider, with a wire, D, on each side, and the main wire tooth A between them, two auxiliary teeth may be secured to the main tooth, and this whether the teeth are made in pairs or single.

In some cases it is found that where the grass is short the teeth of the ordinary tedders and rakes are too far apart to thoroughly manipulate the grass well in drying and raking it, and still the number of teeth cannot well be increased, owing to the space occupied by the coils; but in the manner above described I can increase the number of teeth on any given length of single bar to any desired extent without increasing the coils, and at very trifling expense.

It is of course evident that the auxiliary teeth might be united to the main tooth by welding; but the temper of the wire being so low the heating of the wire so destroys its temper that it cannot be restored.

It is also obvious that a set-screw might be used in the clamp E instead of a key, a; but the constant vibration of the teeth in use would soon loosen the screw, whereas the key renders the juncture perfectly secure and firm.

I do not, therefore, claim a rake or tedder tooth having one or more auxiliary teeth secured thereto either by welding or by a set-screw.

Having thus described my invention, what I claim as new is—

The combination of an auxiliary tooth, D, the clamp E, the key a, and the tooth A, substantially as and for the purpose described.

ANDREW GALE.

Witnesses:
FRED N. WITHREL,
GEO. S. TAYLOR.